United States Patent
Veverka (10) Patent No.: US 10,183,630 B1
(45) Date of Patent: Jan. 22, 2019

(54) ADAPTER FOR MOBILE DEVICE

(71) Applicant: Honda Motor Co., Ltd., Tokyo (JP)

(72) Inventor: Kevin A. Veverka, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/726,421

(22) Filed: Oct. 6, 2017

(51) Int. Cl.
  *B60R 7/06* (2006.01)
  *B60R 11/00* (2006.01)
  *B60R 11/02* (2006.01)

(52) U.S. Cl.
  CPC ... *B60R 11/0241* (2013.01); *B60R 2011/0008* (2013.01); *B60R 2011/0056* (2013.01); *B60R 2011/0059* (2013.01); *B60R 2011/0064* (2013.01); *B60R 2011/0089* (2013.01)

(58) Field of Classification Search
  CPC ............. B60R 2011/0005; B60R 11/02; B60R 11/0241; B60R 2011/0008; B60R 2011/0059; B60R 2011/0064; B60R 2011/0089; Y10S 224/929; B65H 75/06; B65H 75/4473
  USPC .................................................. 224/483, 547
  See application file for complete search history.

(56) References Cited

U.S. PATENT DOCUMENTS

| | | | | |
|---|---|---|---|---|
| 3,089,597 | A * | 5/1963 | Kaplan | A47K 10/185 221/46 |
| 3,423,571 | A * | 1/1969 | Trachtenberg | A47J 41/005 174/135 |
| 4,778,125 | A * | 10/1988 | Hu | H02G 11/02 191/12.2 R |
| 6,138,969 | A * | 10/2000 | Olausson | B60R 11/02 224/483 |
| 6,142,405 | A * | 11/2000 | Black | B65H 75/06 242/388.6 |
| 9,148,030 | B1 * | 9/2015 | Johnson | H02J 7/0042 |
| 9,712,652 | B2 | 7/2017 | Baschnagel | |
| 2004/0182897 | A1 * | 9/2004 | Andrews | B60N 3/005 224/274 |
| 2015/0129724 | A1 * | 5/2015 | Kohmoto | F16B 2/12 248/52 |

OTHER PUBLICATIONS

"Shinji Car Kit" http://liverex.net/2174 (Accessed Jul. 27, 2017).
"iBolt CPro NFC Combo Car Dock" https://www.amazon.com/iBOLT-Charging-mounting-options-adhesive/dp/B01AU34J30 (Accessed Jul. 27, 2017).

(Continued)

*Primary Examiner* — Adam Waggenspack
(74) *Attorney, Agent, or Firm* — Honda Patents & Technologies North America, LLC; Mark E. Duell (57) ABSTRACT

An adapter securing a mobile device to a vehicle is disclosed. The adapter is positioned between an interior trim part and a vehicle component, and is configured for receiving a cable. The cable includes a connector at a first end of the cable for connecting the cable to the mobile device. The adapter includes a base, a first member extending outwardly from the base, a second member extending outwardly from the base substantially parallel to the first member, and a plurality of cross bars extending between the first member and the second member, the cross bars configured such that the cable may be threaded and looped around the cross bars.

7 Claims, 10 Drawing Sheets

(56) References Cited

OTHER PUBLICATIONS

"Appleiphoney usb holder cable Charging & data sync Applicable" https://www.aliexpress.com/item/appleiphoney-usb-holder-cable-Charging-data-sync-Applicable-to-cover-i-phone-6s-unlocked-phones-flip/32637704258.html?spm=2114.40010708.4.38.RnYPA7 (Accessed Jul. 27, 2017).
"Car Vent Mobile Device Holder" https://www.anypromo.com/technology/smartphone-accessories/car-vent-mobile-device-holder-p718610?utm_source=PLA&utm_medium=PC&utm_campaign=718610&s=1&glppc=1&gclid=Cj0KCQjwnubLBRC_ARIsAASsNNn4uRaOR1-8SVjfBd7tnWbe_3-LaelKDMal3uPYT501piFrEFOvWAMaAv6gEALw_wcB (Accessed Jul. 27, 2017).
"Bcase TUP Car Air Vent Ocean Fragrance Magnetic Cable Clips Wire Cable Organizer" https://www.banggood.com/Bcase-TUP-Car-Air-Vent-Ocean-Fragrance-Magnetic-Cable-Clips-Wire-Cable-Organizer-p-1072663.html (Accessed Jul. 27, 2017).

* cited by examiner

SECTION A-A
FIG. 12

ADAPTER FOR MOBILE DEVICE

TECHNICAL FIELD

The embodiments disclosed herein are directed to an adapter for holding a mobile device in place, and more specifically in vehicle.

BACKGROUND

Cables, such as those having a Lightning® connector, a Universal Serial Bus (USB) connector, or any other known connector, may be used in a vehicle for connecting for electronic mobile devices, such as a cell phone, to the vehicle. However, the cables cannot support the mobile device in a predetermined position, such as in view of the driver of the vehicle in a hands-free orientation. Therefore, there is a need for an adapter for stabilizing the cable and holding the mobile device in the predetermined position.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, an adapter securing a mobile device to a vehicle is disclosed. The adapter is positioned between an interior trim part and a vehicle component, and is configured for receiving a cable. The cable includes a connector at a first end of the cable for connecting the cable to the mobile device. The adapter includes a base, a first member extending outwardly from the base, a second member extending outwardly from the base substantially parallel to the first member, and a plurality of cross bars extending between the first member and the second member, the cross bars configured such that the cable may be threaded and looped around the cross bars.

According to another aspect, a method of securing a mobile device to a vehicle between an interior trim part and a vehicle component is disclosed, the mobile device having a cable, the cable having a connector at a first end of the cable for connecting the cable to the mobile device. The method including the steps of providing an adapter, the adapter including a base, a first member extending outwardly from the base, a second member extending outwardly from the base substantially parallel to the first member, and a plurality of cross bars extending between the first member and the second member, and threading the cable around at least one of the plurality of cross bars.

According to yet another aspect, an adapter securing a mobile device to a vehicle is disclosed. The adapter is configured for receiving a cable, the cable having a connector at a first end of the cable for connecting the cable to the mobile device. The adapter includes a base, a first circular member integrally formed with the base, the first circular member having a first radius, a cylindrical member extending axially away from the first circular member, the cylindrical member having a second radius, a second circular member extending radially outward from a distal end of the cylindrical member, the second circular member having a third radius, and wherein the cable is wrapped around the cylindrical member.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
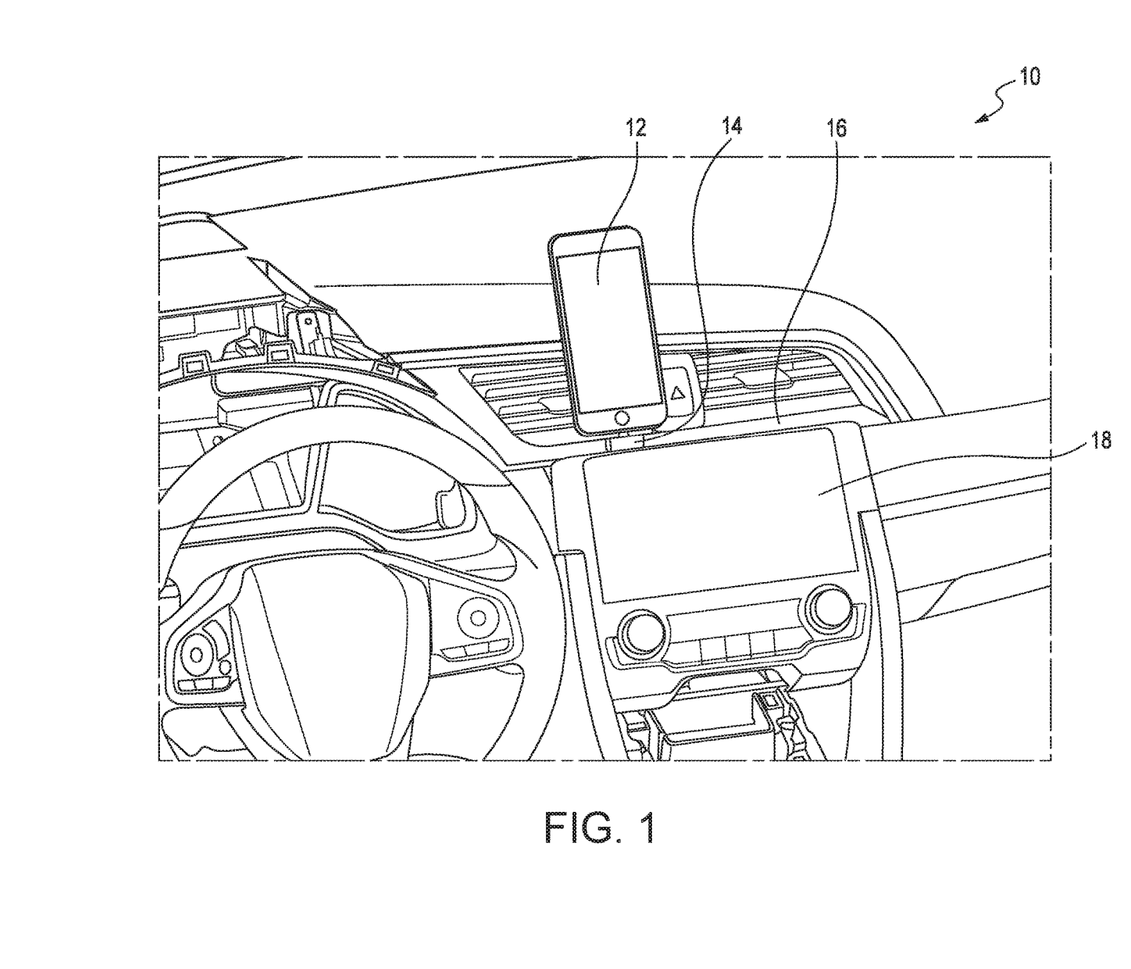
FIG. 1 is a perspective view of a portion of an interior of a vehicle.
Figure 2:
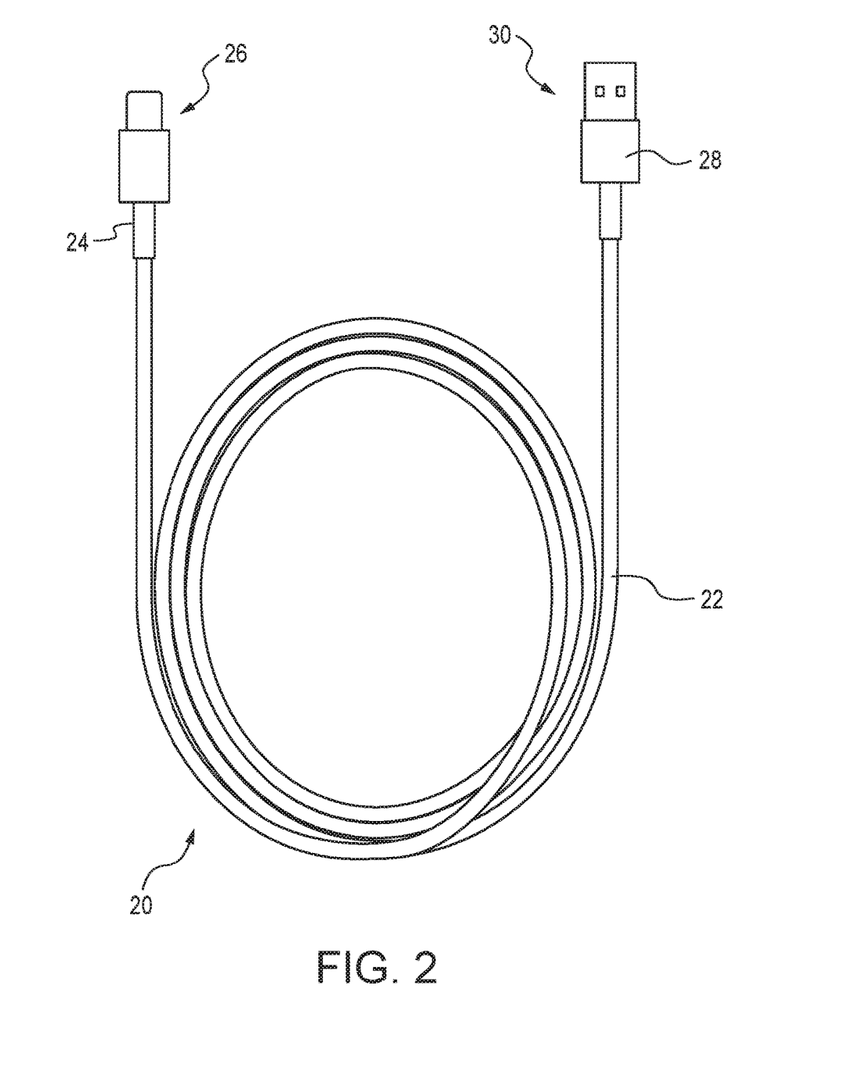
FIG. 2 is a representation of a cable for attaching a mobile to device to the vehicle.
Figure 3:
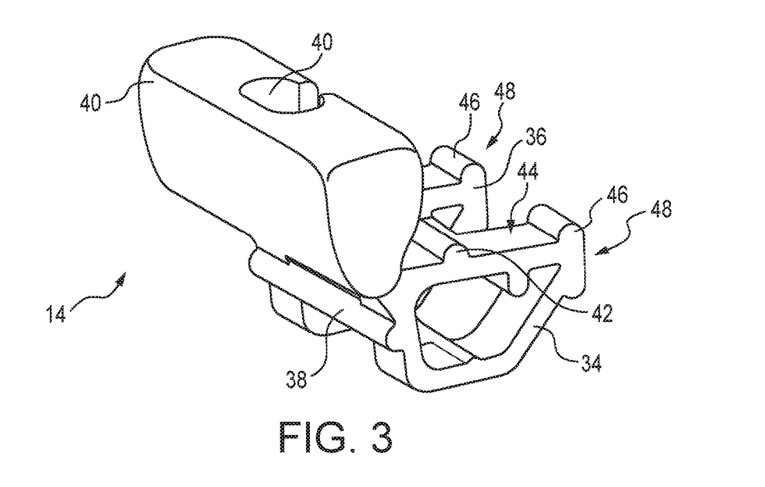
FIG. 3 is a perspective view of an adapter for securing the cable in the vehicle.
Figure 4:
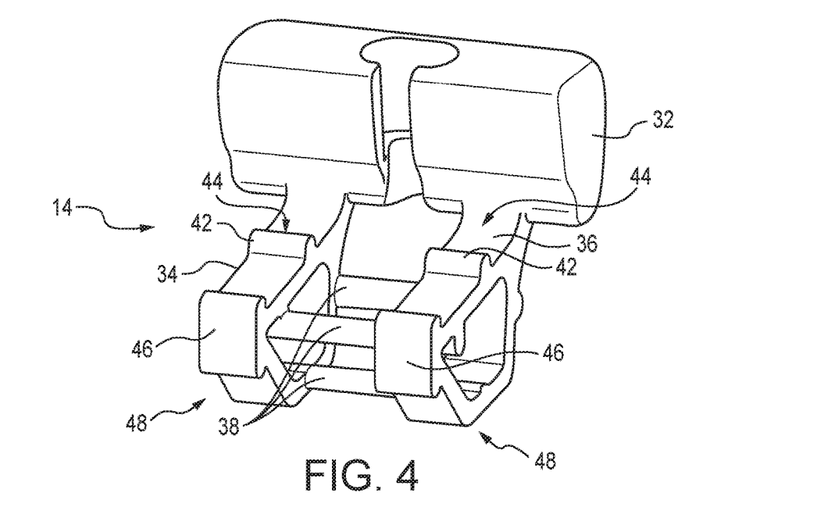
FIG. 4 is a rear view of the adapter of FIG. 3.
Figure 5:
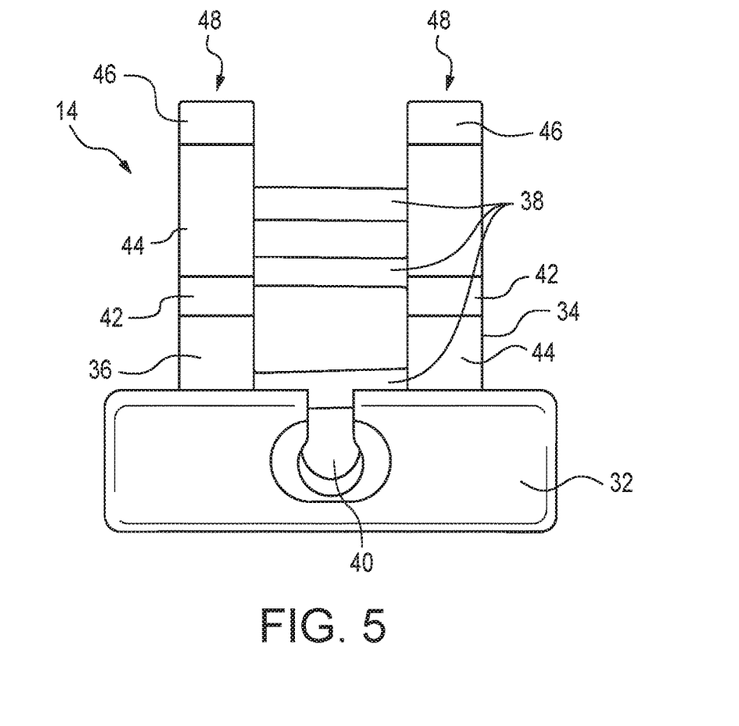
FIG. 5 is a top view of the adapter of FIG. 3.
Figure 6:
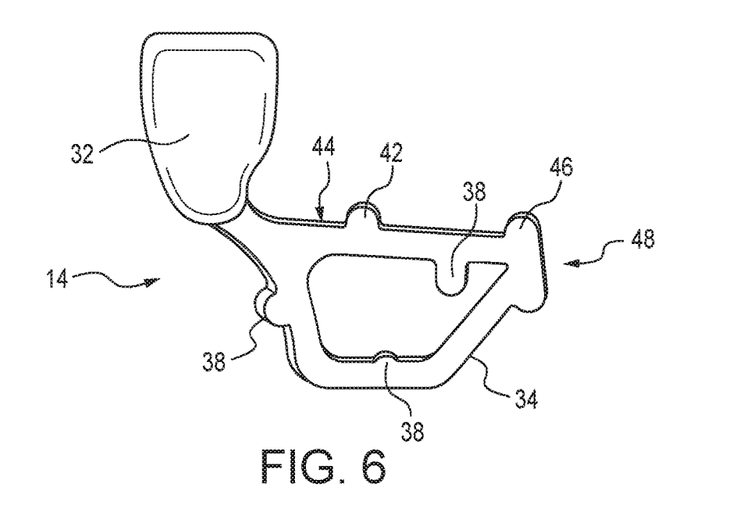
FIG. 6 is a side view of the adapter of FIG. 3.
Figure 7:
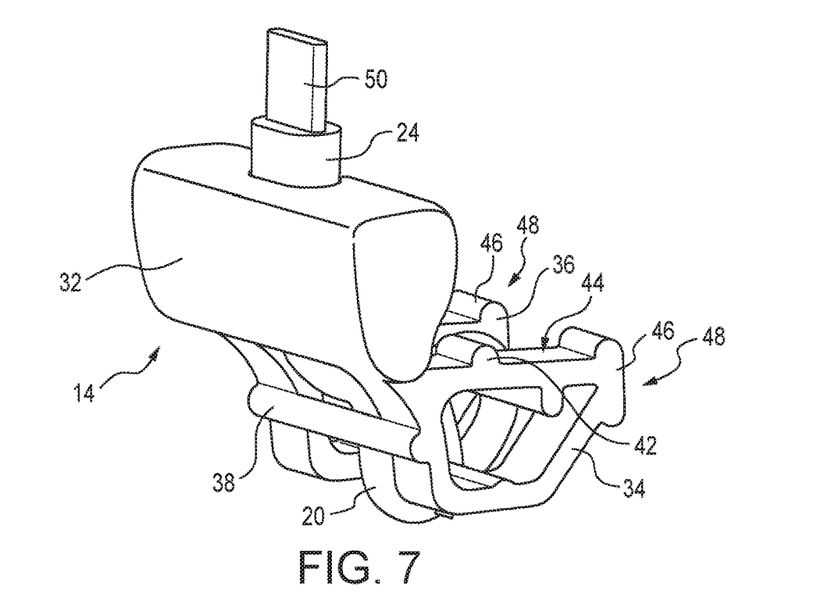
FIG. 7 is a perspective view of the adapter of FIG. 3 securing the cable.
Figure 8:
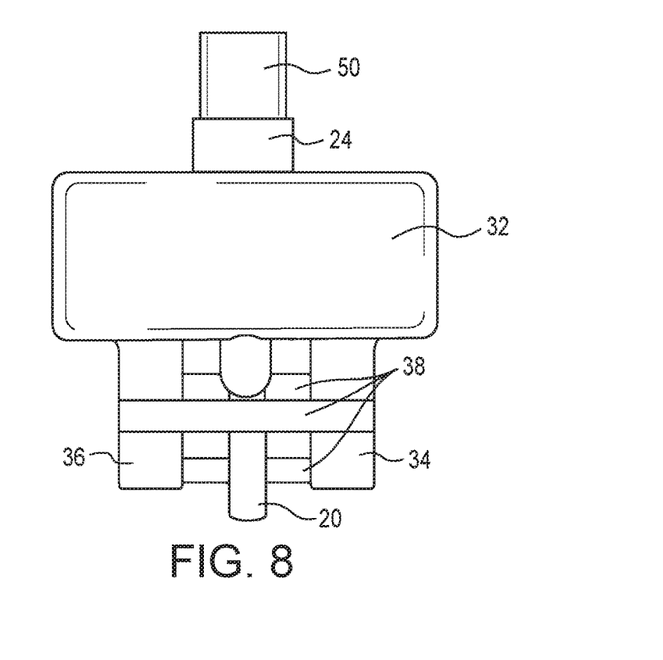
FIG. 8 is a front view of the adapter of FIG. 3 securing the cable.
Figure 9:
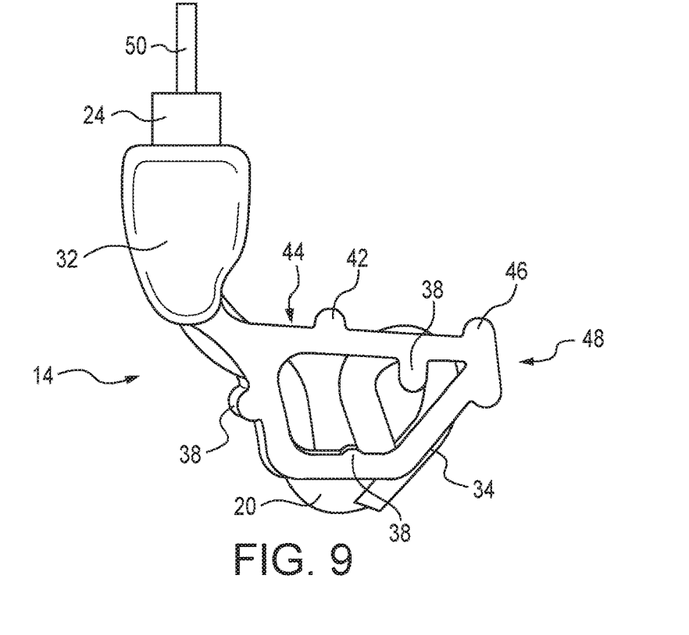
FIG. 9 is a side view of the adapter of FIG. 3 securing the cable.
Figure 10:
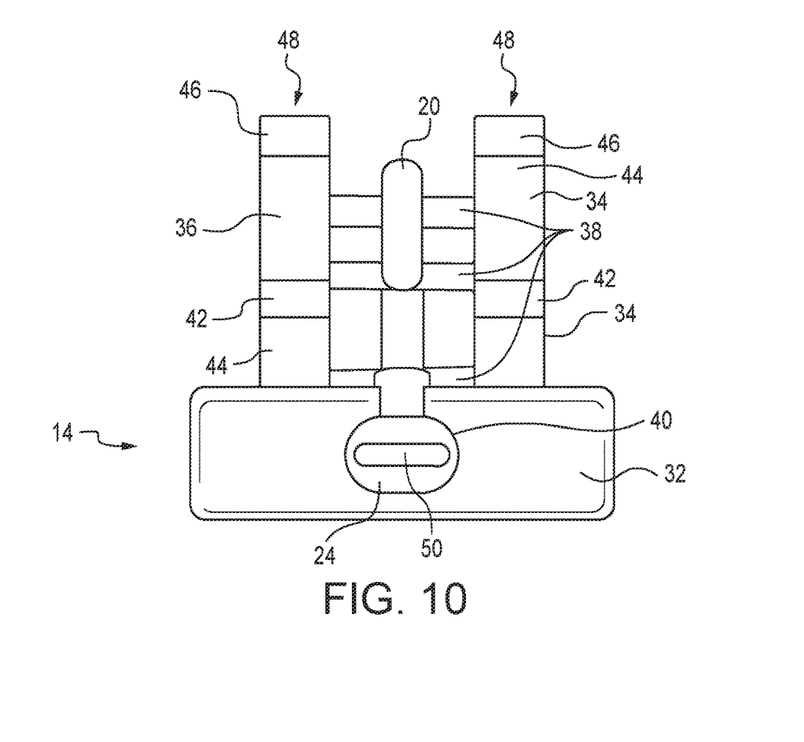
FIG. 10 is a top view of the adapter of FIG. 3 securing the cable.

FIG. 1 illustrates one embodiment of an adapter 14 for securing a mobile device 12, such as a mobile or cellular telephone, to a vehicle 10. In the embodiment illustrated in FIG. 1, the adapter 14 is positioned between an interior trim part 16 and a vehicle component 18, which in this case is a screen of an in-vehicle navigation and infotainment system. The adapter 14 is configured to receive a cable 20, shown in FIG. 2, of the type to connect the mobile device 12 to the vehicle 10. The cable 20 may include a wire (not shown), an electrically insulating sheath 22 covering the wire, and a connector 24 at a first end 26 of the cable 20 for connecting the cable 20 to the mobile device 12. In the embodiment illustrated in FIG. 2, the connector 24 is a Lightning® connector for use with devices manufactured by Apple®, although the connector 24 may also be standard USB or other proprietary connectors. The cable 20 may further include a standard USB-type connector 28 at a second end 30 of the cable 20, which may be plugged into a USB port, power adapter, or any other suitable port.

FIGS. 3-6 are illustrations of the embodiment of the adapter 14 in FIG. 1. The adapter 14 includes a base 32, a first member 34 extending outwardly from the base 32, and a second member 36 extending outwardly from the base 32 substantially parallel to the first member 34. A plurality of cross bars 38 extend between the first member 34 and the second member 36. In the embodiment illustrated in FIGS. 3-6, the adapter 14 includes three cross bars 38 extending between the first member 34 and the second member 36. The cross bars 38 are configured such that the cable 20 may be threaded and looped around the cross bars 38, as illustrated in FIGS. 7-10, to hold the cable 20 tightly in place.

In the embodiment illustrated in FIGS. 3-6, the base 32, first and second members 34, 36, and cross bars 38 are all integrally formed. The adapter 14 may be constructed from any suitable material, such as plastic, and may be formed by any known method, such as molding, 3-D printing, or any other known method.

With continuing reference to FIGS. 3-10, the base 32 of the adapter 14 may further include a recess 40 for receiving the connector 24 of the cable 20. The shape of the recess 40 should match that of a portion of the connector 24, allowing the connector 24 to insert into the recess 40 and be held firmly with an interference fit.

The adapter 14 may include a rib 42 on an outer surface 44 of each of the members 34, 36. The adapter 14 may further include a rib 46 at a distal end 48 of each of the members 34, 36. The ribs 42, 46 are configured to create an interference fit with the interior trim part 16, which is discussed in greater detail below.

To use the adapter 14, the cable is threaded around the cross bars 38 as illustrated in FIGS. 7-10. To complete the attachment of the cable 20 to the adapter 14, the connector 24 is inserted into the recess 40 in the base 32, with the exposed connection end 50 of the connector 24 extending outward beyond the base 32 for receiving the mobile device 12. In this embodiment, the mobile device 12 may be supported only by the connection with the connector 24 in a substantially freestanding manner. The connection between the mobile device 12 and the connector 24 may help to maximize an unobstructed view of the mobile device 12 by the user in the vehicle 10.

Figure 11:
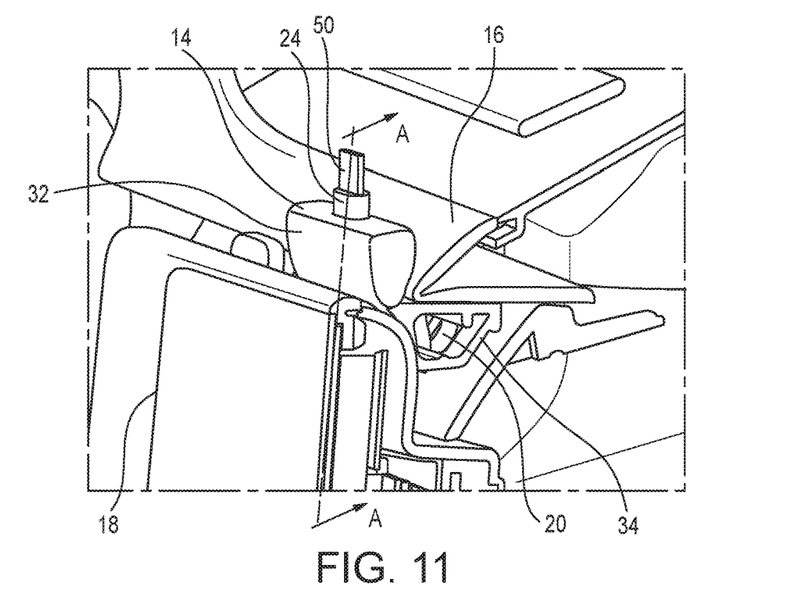
FIG. 11 is a side view of the adapter securing the cable installed between a vehicle trim component and a vehicle component.
Figure 12:
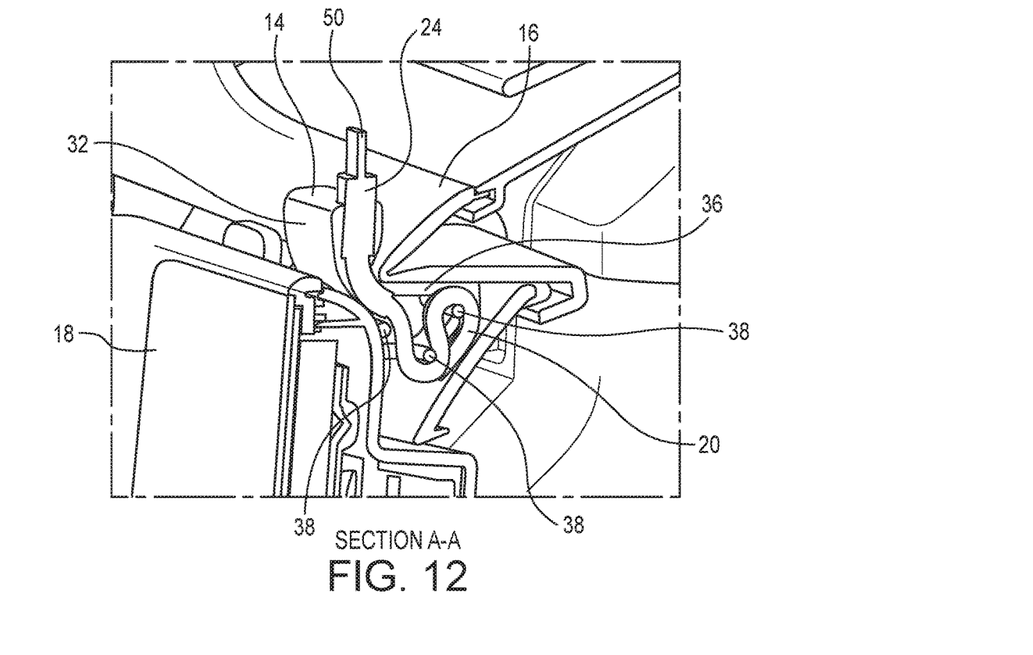
FIG. 12 is a perspective view, partly in section taken along line A-A of FIG. 11.

As illustrated in FIGS. 11-12, once the cable 20 is secured to the adapter 14, the adapter 14 is inserted between the interior trim part 16 and the vehicle component 18. The ribs 42, 46 of the members 34, 36, as previously illustrated in FIGS. 3-10, create an interference fit with the interior trim part 16. Additionally, the interior trim part 16 and the vehicle component 18 further create an interference fit with the base 32 to secure the adapter 14. The mobile device 12, such as an iPhone® manufactured by Apple®, may then be attached to the connector 24 of the cable 20.

Figure 13:
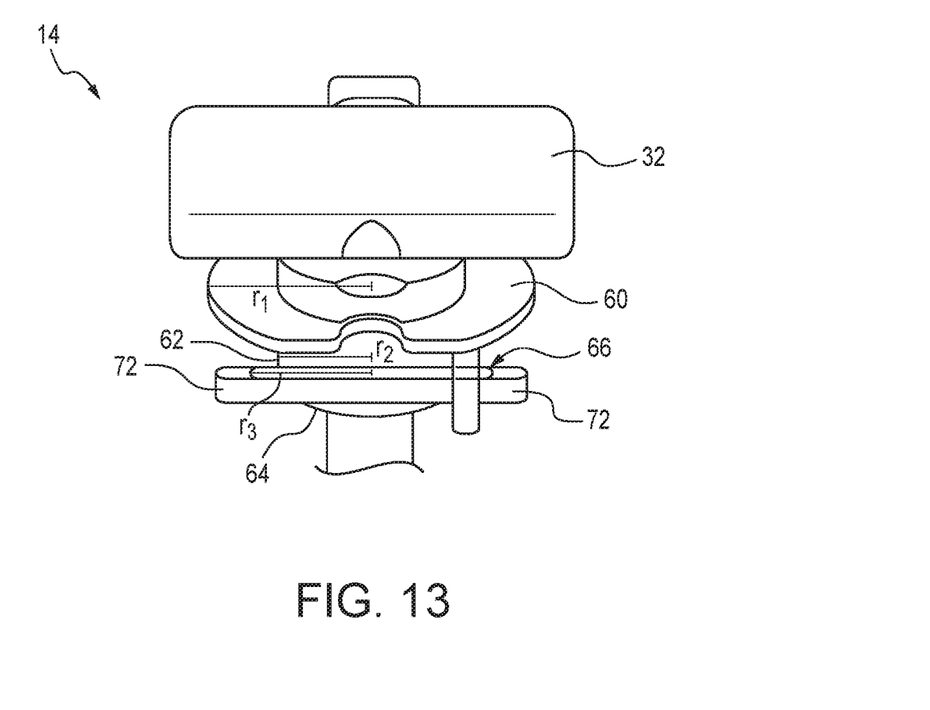
FIG. 13 is a bottom perspective view of an alternate embodiment of an adapter securing the cable.
Figure 14:
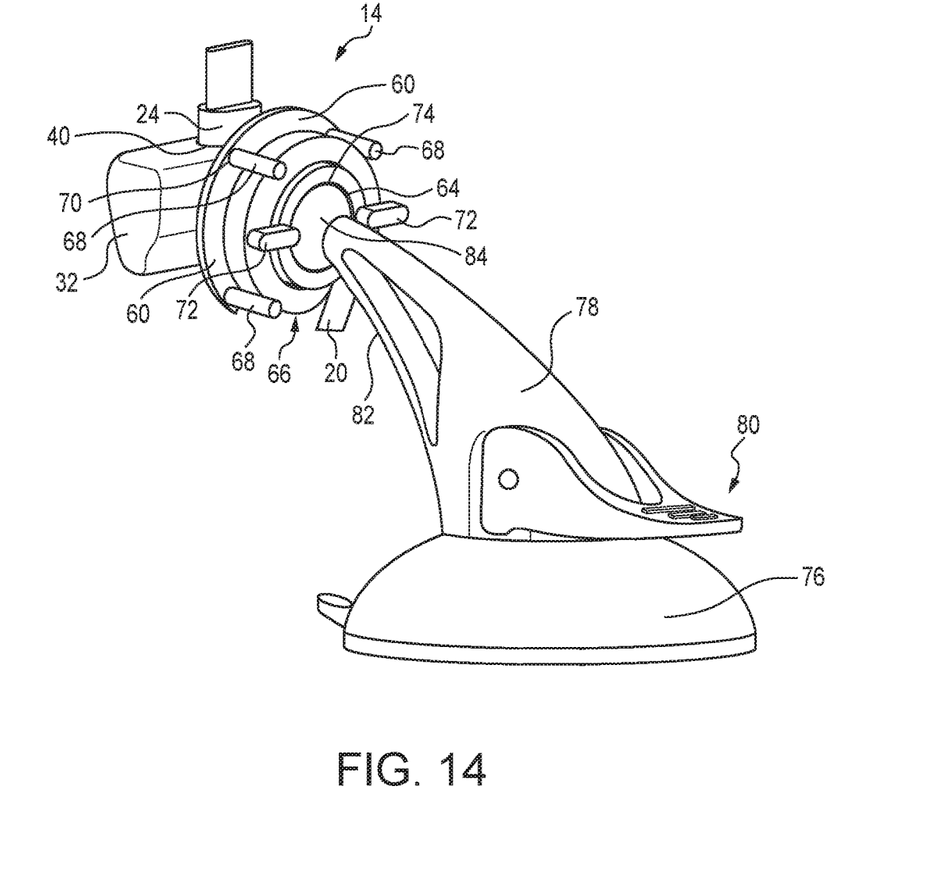
FIG. 14 is one embodiment of the adapter of FIG. 13 with a suction cup attachment arm.
Figure 15:
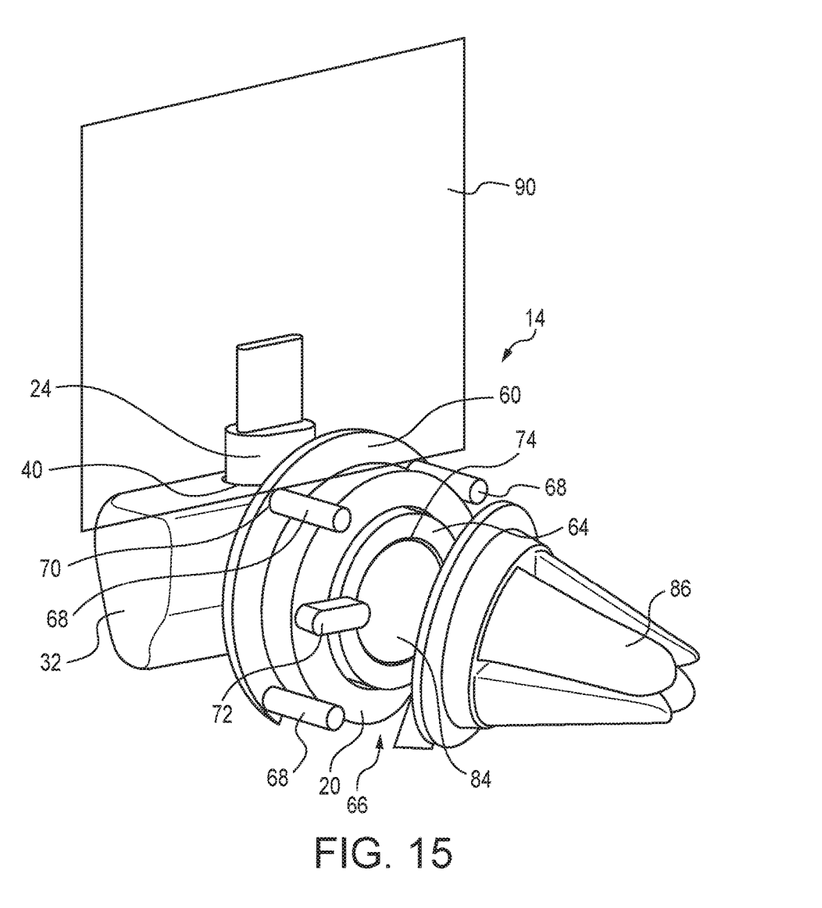
FIG. 15 is another embodiment of the adapter of FIG. 13 with a backing plate and clip attachment.

In an alternate embodiment illustrated in FIGS. 13-15, the adapter 14 may include a first circular member 60 integrally formed with the base 32. The first circular member 60 has a radius $r_1$. A cylindrical member 62 extends axially away from the first circular member 60. The cylindrical member 62 has a second radius $r_2$. A second circular member 64 extends radially outward from a distal end 66 of the cylindrical member 62. The second circular member 64 has a third radius $r_3$. The circular members 60, 64 and cylindrical member 62 are arranged such that $r_2<r_3<r_1$. The cable 20 is wrapped around the cylindrical member 62 between the first and second circular members 60, 64.

In the embodiment illustrated in FIGS. 14-15, the adapter 14 may include a recess 40 for receiving the connector 24 of the cable 20 in the base 32.

FIGS. 14-15 illustrate the alternate embodiment in greater detail. At least one cable routing post 68 extending axially from an outer edge 70 of the first circular member 60, which holds the cable 20 in place when wrapped around the cylindrical member 62. The second circular member 64 further may include at least one cable securing post 72 extending radially outward from of the second circular member 64, which also further acts to hold the cable 20 in place when wrapped around the cylindrical member 62.

The distal end 66 of the cylindrical member 62 and the second circular member 64 further defines a socket 74 of a ball and socket joint. The adapter 14 may further include, as illustrated in FIG. 14, a suction cup 76 for attaching the adapter 14 to a portion of the vehicle 10, such as the interior trim part 16. A first end 80 of an arm 78 is connected to the suction cup 76, and a second end 82 of the arm 78 defining a ball joint 84 is inserted in the socket 74 of the ball and socket joint to connect the arm 78 to the adapter 14.

As illustrated in FIG. 15, in an alternate embodiment, a clip 86 for attaching the adapter 14 to a portion of the vehicle 10 is shown. The clip 86 includes a ball joint 84 to be inserted in the socket 74 of the ball and socket joint to connect the clip 86 to the adapter 14. The clip 86 is adapted to be connected to an interior trim part 16, such as a vent for the heating, ventilation, and air conditioning system of the vehicle 10.

In an alternate embodiment, further illustrated in FIG. 15, the base 32 may include a backing plate 90 extending outwardly from the base 32 between the recess 40 and the first circular member 60. The backing plate 90 is positioned to support the mobile device 12 when the mobile device 12 is attached to the connector 24. The backing plate 90 may reduce vibration of the mobile device 12 when connected to the connector 24. The friction between the backing plate 90 and the mobile device 12 may also help to hold the mobile device 12 in place when attached to the connector 24.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. An adapter for securing a mobile device to a vehicle, the adapter being positioned between an interior trim part and a vehicle component, the adapter configured for receiving a cable, the cable having a connector at a first end of the cable for connecting the cable to the mobile device, the adapter comprising:
   a base for securing the cable to the vehicle and for securing a mobile device to the base and to the vehicle via the cable;
   a first member extending outwardly from the base;
   a second member extending outwardly from the base substantially parallel to the first member; and a plurality of cross bars extending between the first member and the second member, the cross bars configured such that the cable may be threaded and looped around the cross bars the first and second member for creating an interference fit with the interior trim part and vehicle component to secure the adapter in place in the vehicle such that the cross bars are located between the interior trim part and the vehicle component.

2. The adapter of claim 1 wherein the base has a recess for receiving the connector of the cable.

3. The adapter of claim 2 wherein the first member further comprises:

a first rib on an outer surface of the first member.

4. The adapter of claim 3 wherein the second member further comprises:

a second rib on an outer surface of the second member.

5. The adapter of claim 4 wherein the first member further comprises:

a third rib at a distal end of the first member, the first and third ribs being configured to create an interference fit with the interior trim part.

6. The adapter of claim 5 wherein the second member further comprises:

a fourth rib at a distal end of the second member, the second and fourth ribs being configured to create an interference fit with the interior trim part.

7. The adapter of claim 1 wherein the vehicle component is a screen for a vehicle infotainment system.

* * * * *